Sept. 28, 1943.   W. B. FAGEOL   2,330,482
VEHICLE SPRING SUSPENSION
Filed March 26, 1941   7 Sheets-Sheet 1
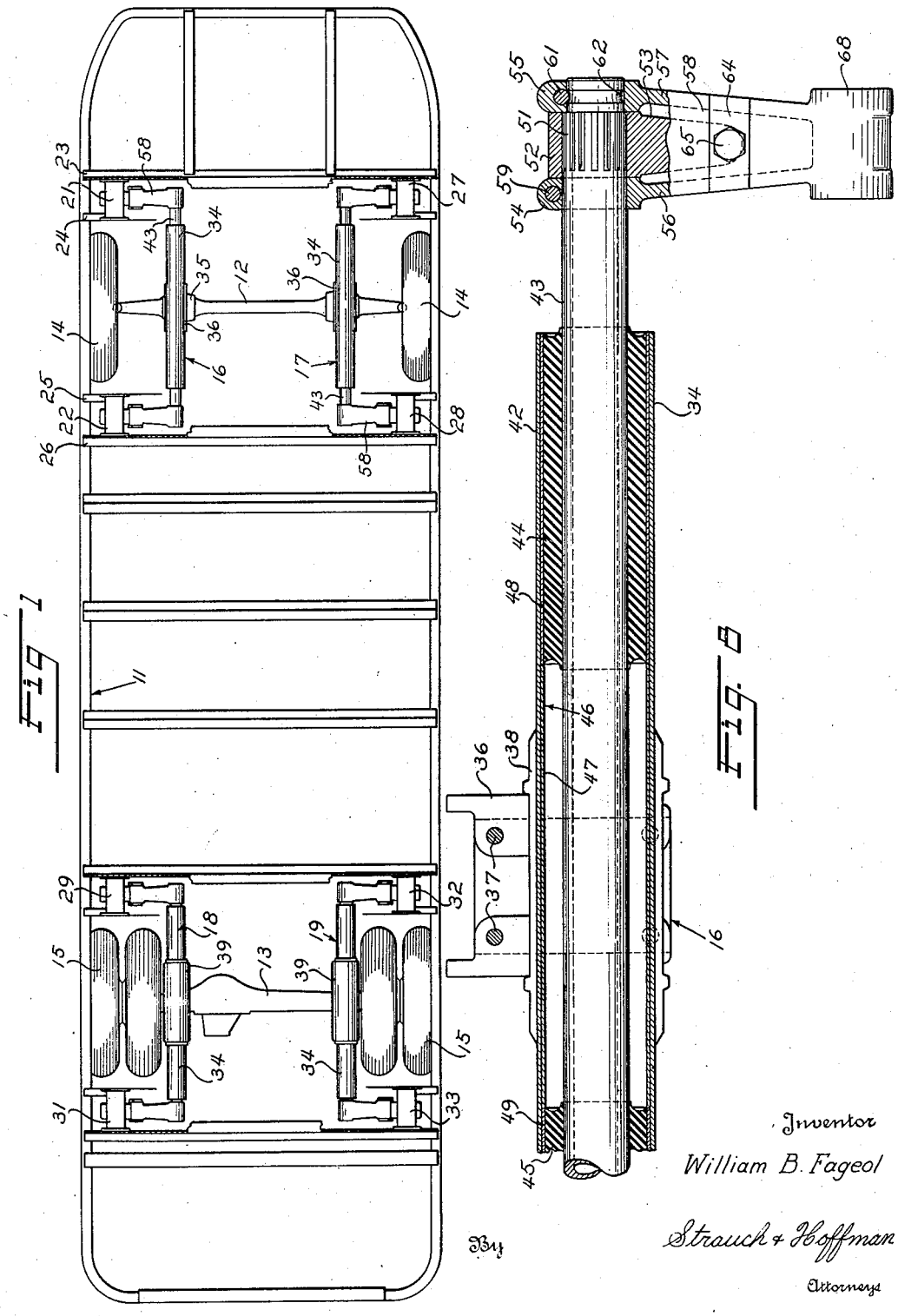

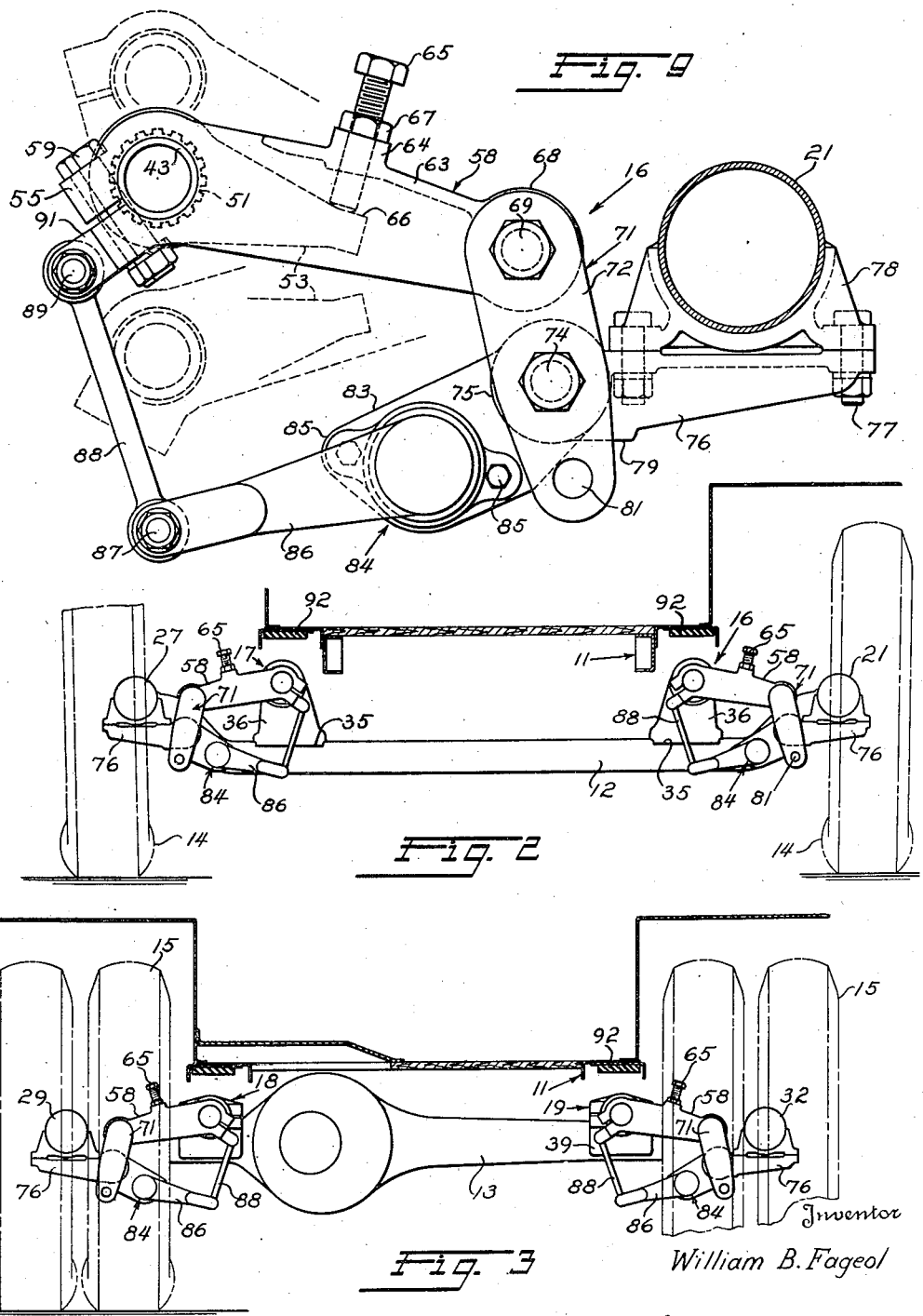

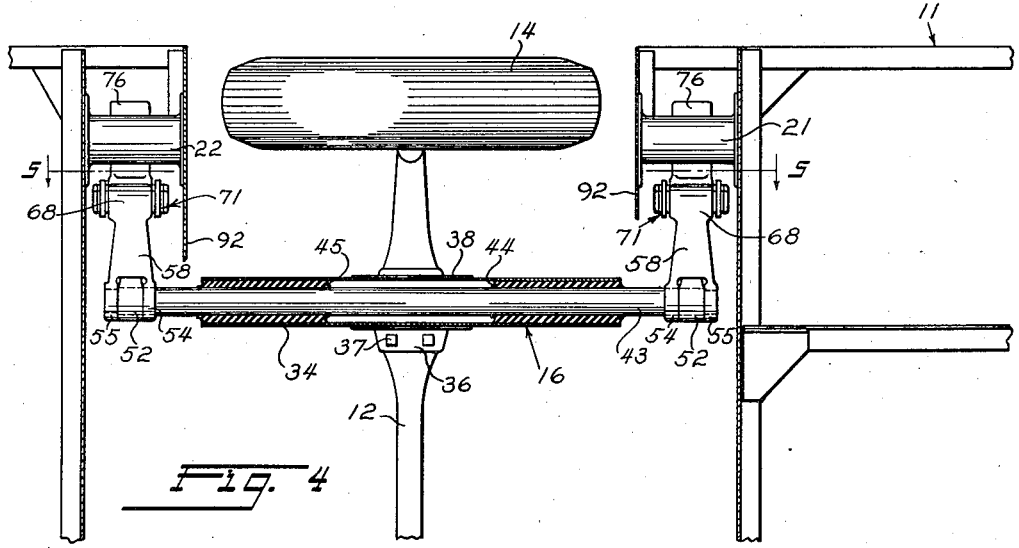
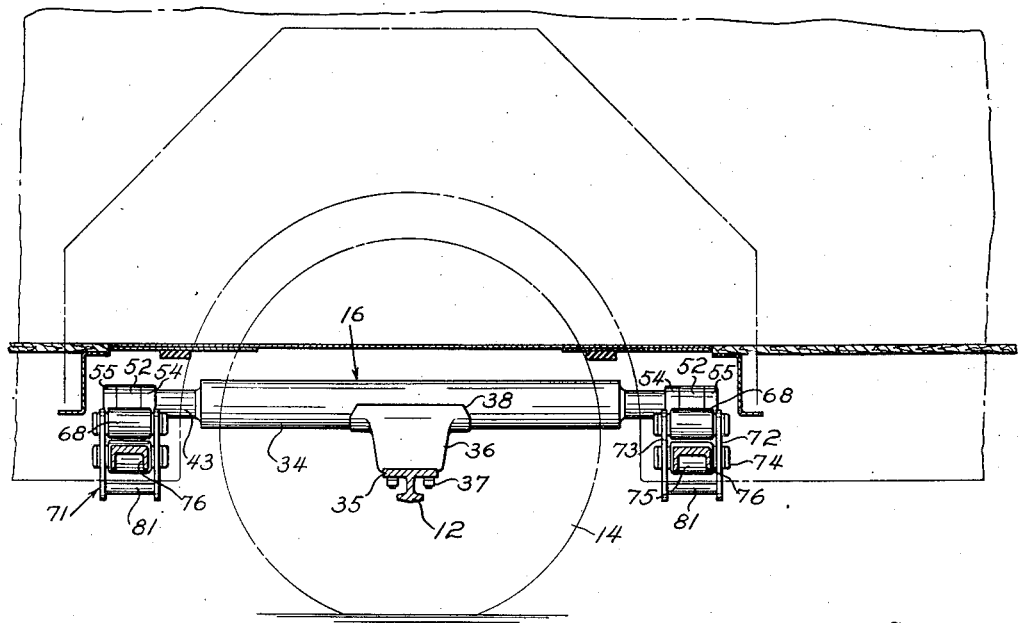

Sept. 28, 1943. W. B. FAGEOL 2,330,482
VEHICLE SPRING SUSPENSION
Filed March 26, 1941 7 Sheets-Sheet 4
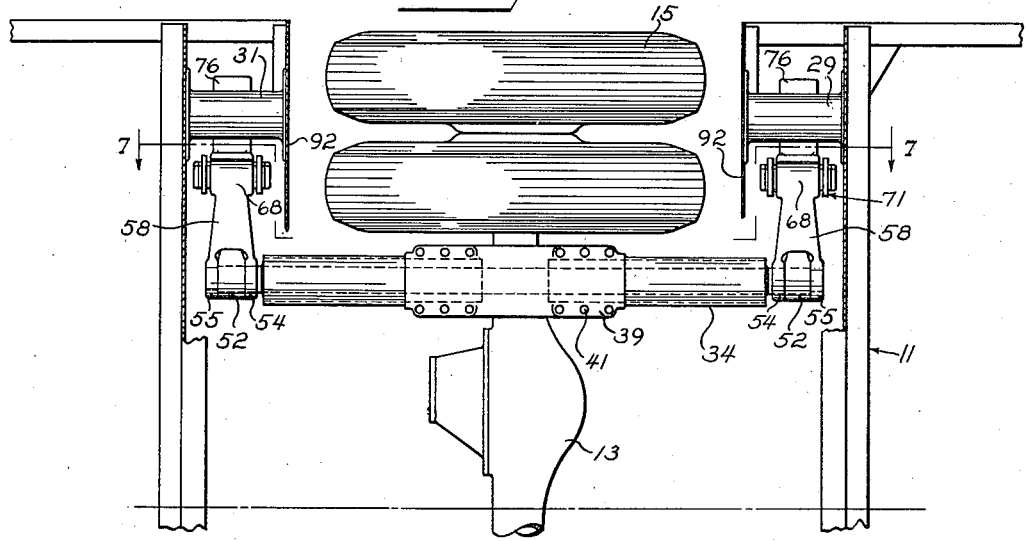
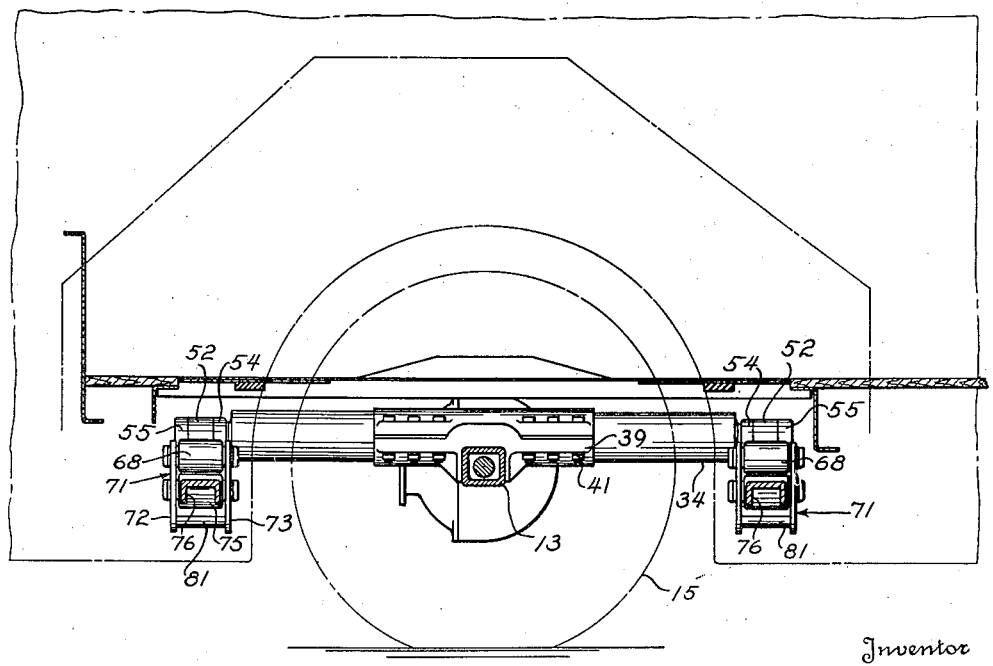
Inventor
William B. Fageol
By Strauch & Hoffman
Attorneys

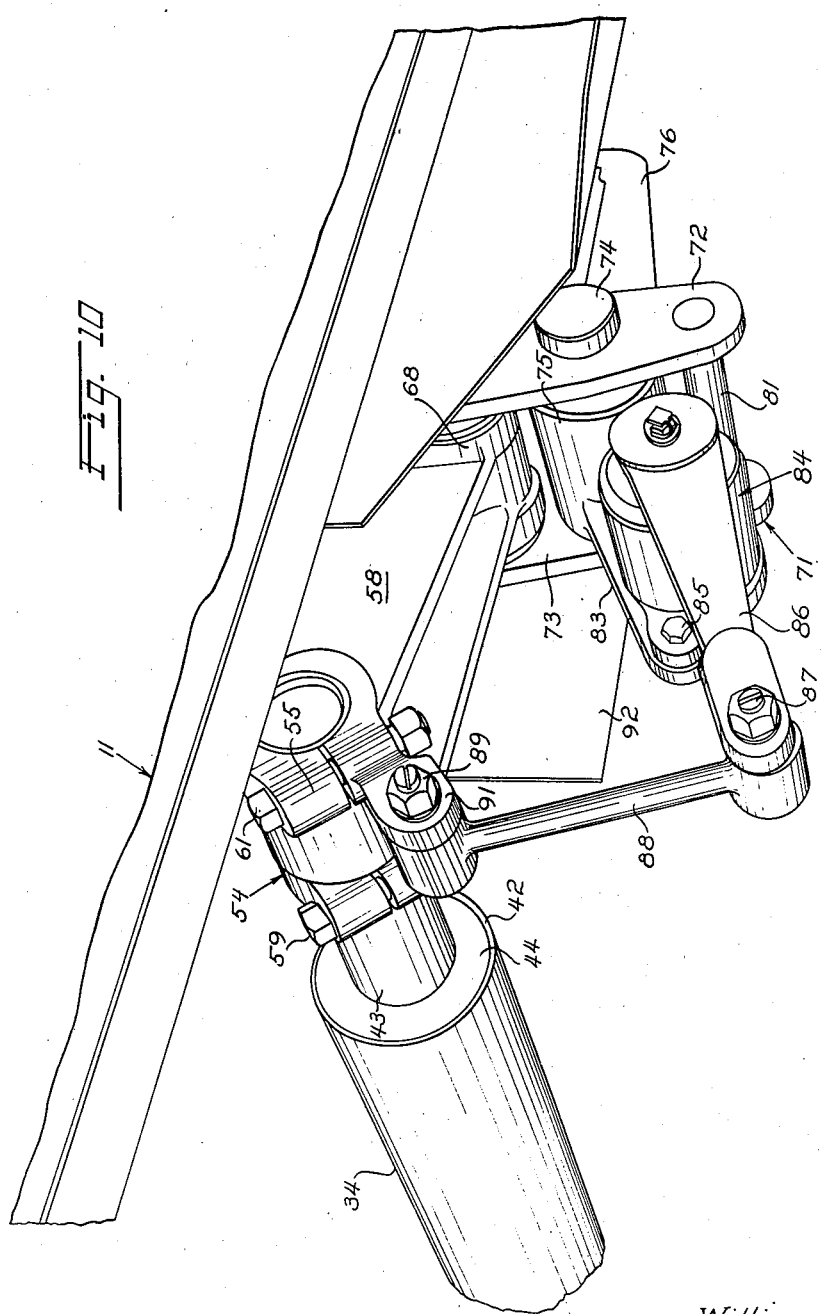

LOAD DEFLECTION CURVES —

Sept. 28, 1943.  W. B. FAGEOL  2,330,482
VEHICLE SPRING SUSPENSION
Filed March 26, 1941   7 Sheets-Sheet 7
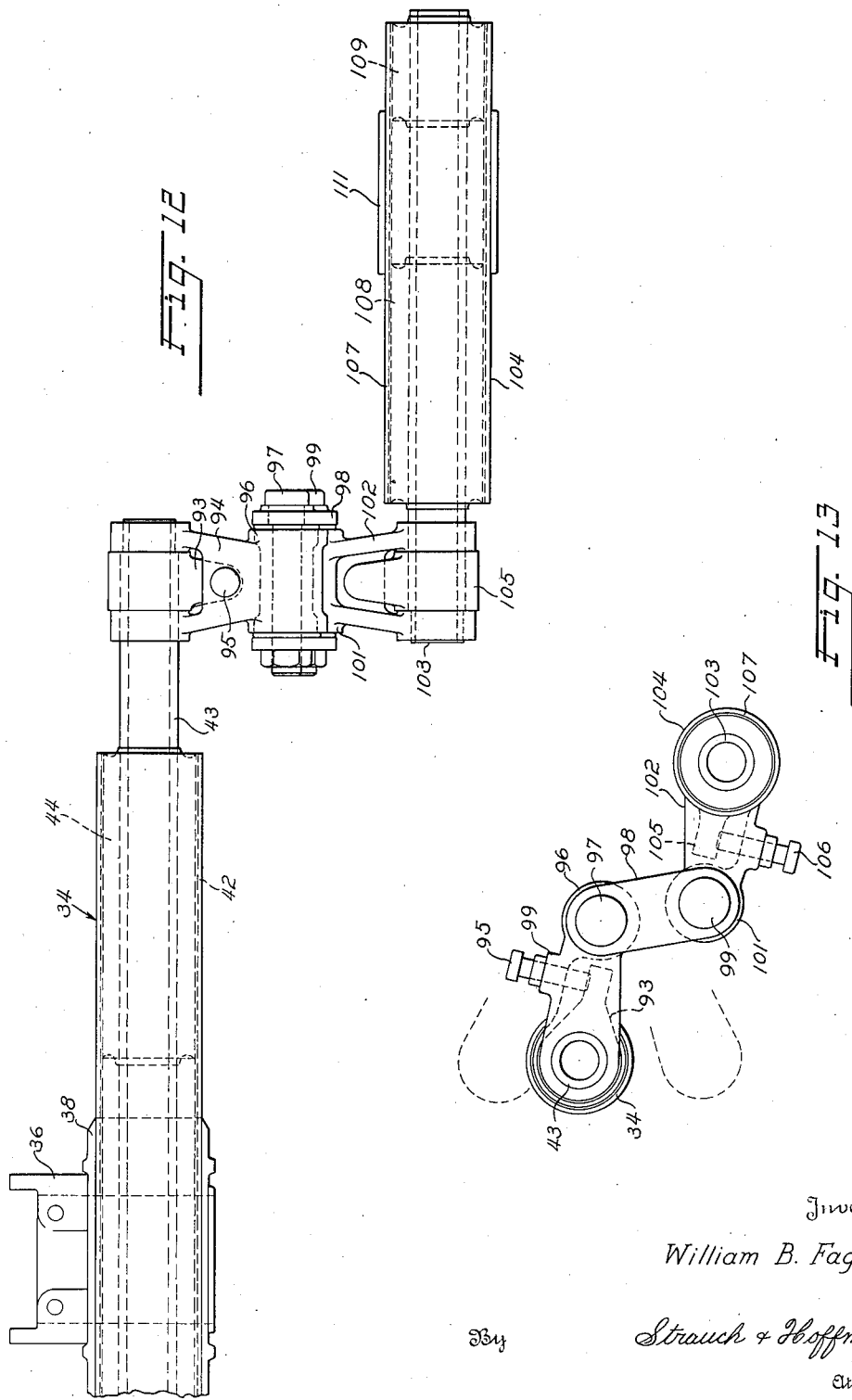
Inventor
William B. Fageol
By Strauch & Hoffman
Attorneys Patented Sept. 28, 1943

2,330,482

UNITED STATES PATENT OFFICE 2,330,482

VEHICLE SPRING SUSPENSION

William B. Fageol, Kent, Ohio, assignor to Twin Coach Company, Kent, Ohio, a corporation of Delaware Application March 26, 1941, Serial No. 385,364

26 Claims. (Cl. 280—106.5)

My present invention relates to vehicles and spring suspensions therefor, and is more particularly concerned with vehicles embodying spring suspensions of the so-called torsion type.

Torsion type spring suspensions are well-known, and the type illustrated in United States Patents Nos. 2,116,516 and 2,160,862 has gone into substantial commercial use on passenger carrying buses. However, it has been found that unless such suspensions are very accurately fitted and installed, the linkages bind in operation of the vehicle, tending to cause breakage of parts in operation, and to destroy the riding qualities of the vehicle. Furthermore, such suspensions utilize comparatively long torsion rods which must be suitably supported by and secured to the vehicle framing, and complicate the chassis running gear. As a result such prior arrangements are comparatively complicated and expensive to install properly.

The necessity for securing the linkages in such prior suspensions to the chassis or body framing at substantial distances inward from the brackets securing the linkages to the vehicle axles tends to introduce instability in the vehicle body support, and to introduce undesirable side sway during operation of buses equipped with such prior suspensions. And the connections between the axles and the vehicle frame in such prior suspensions are entirely through rigid metal links with resultant undesirable transmission of shocks from the axles to the vehicle frame.

In my present invention I provide a new simplified type of torsion spring suspension for road vehicles, in which the need for the long relatively complicated torsion rod arrangements, the need for expensive accurate fitting of the linkages, and the undesirable instability and side-sway of said prior torsion rod suspensions are eliminated. In addition I eliminate the entirely metal connection between the axles and the body framing, and provide simplified cushioned linkages that give shock insulation and cushioning between the axle and vehicle under-frame, perform the functions of radius rods in properly locating the axles with relation to the body, and fore-shorten the leverage as the load in the vehicle increases, giving an improved, desirable ride, throughout the entire loading range of the vehicle. All of these advantages I secure by the use of rubber torsion sleeves in my improved suspensions which serve as yielding bearings and pivots, take care of end play, and compensate to a substantial degree for misalignment, thereby eliminating any need for accurate and expensive fitting of the parts to secure proper operation. By securing the torsion pivot sleeves to the axles of the vehicle, in the preferred embodiment of my invention, the body or frame supporting brackets may be secured adjacent the sides of the vehicle, rather than toward the center as is necessary in said prior suspensions, thus giving substantially greater stability to the body.

It is accordingly a major object of the invention to provide a vehicle having novel simplified torsion spring suspensions, designed and located to give an improved stabilized cushioned ride and to minimize stresses on the vehicle body and parts incident to operation.

It is a further object of my invention to provide a vehicle having novel, simplified, inexpensive cushioned torsion spring suspensions between body framing or supporting frame and the wheels, which are easily assembled without the need for accurate and expensive fitting and permit controlled relative lateral movement between the frame and wheels, the supporting pivots and linkages being located and arranged to serve as radius rods, and provide improved stability of operation of the vehicle.

It is a further object of the invention to provide a novel spring suspension for a vehicle comprising a tubular torsion spring assembly having a sleeve of rubber or like resilient material arranged with its axis longitudinal to the vehicle and a system of laterally outwardly extending suspension links so constructed and arranged that they function as radius rods for the axles and so the leverage is fore-shortened as the load increases to provide desirable riding qualities under all operating conditions. Preferably the spring mechanism is preloaded so that it is under predetermined torsion during all normal operating conditions of the vehicle, whereby relative vertical movements betwen the frame and axle of the vehicle or other wheel supporting structure are always under control of the spring.

A further object of the invention is to provide a spring suspension for a vehicle comprising a novel torsion spring assembly and associated linkage permitting controlled relative lateral movements between the frame and the axles or equivalent wheel supported structure, and an improved shock absorber arrangement to further control said movements for increased stabilization in operation.

Further objects of the invention will presently appear as the description of the invention proceeds in connection with the appended claims and the annexed drawings in which:

Figure 1 is a top plan view of the body supporting frame of a vehicle equipped with the torsion spring suspensions of the invention;

Figure 2 is a somewhat diagrammatic front elevation of the front or non-driven axle of the vehicle of Figure 1, illustrating especially the location of the shock absorbers controlling relative lateral movement between the body and the axle;

Figure 3 is a somewhat diagrammatic rear elevation of the rear or driven axle of the vehicle of Figure 1, illustrating the torsion spring suspension of the invention applied thereto;

Figure 4 is an enlarged top plan view of the left front corner of the vehicle of Figure 1, illustrating the spring suspension at that end of the axle in greater detail;

Figure 5 is a side elevation of the suspension of Figure 4;

Figure 6 is an enlarged top plan view of the left side of the rear axle of the vehicle of Figure 1, illustrating the spring suspension at that end of the axle in detail;

Figure 7 is a side elevation of the suspension of Figure 6;

Figure 8 is an enlarged sectional view illustrating structural details of each tubular torsion spring assembly and the adjustable compound suspension link at each end thereof;

Figure 9 is an enlarged elevation illustrating the suspension linkage employed to connect the torsion spring to the frame, and indicating in dotted lines the limits of vertical axle movement relative to the body frame during operation of the vehicle;

Figure 10 is a perspective view of the suspension of the invention illustrating especially the shock absorber mounting;

Figure 12 is an enlarged top plan view of a further embodiment of the invention wherein the suspension includes two separate torsion spring assemblies; and Figure 13 is a fragmentary end elevation of the suspension of Figure 12 illustrating in dotted lines the upper and lower limits of normal movement of the axle.

Figure 11:
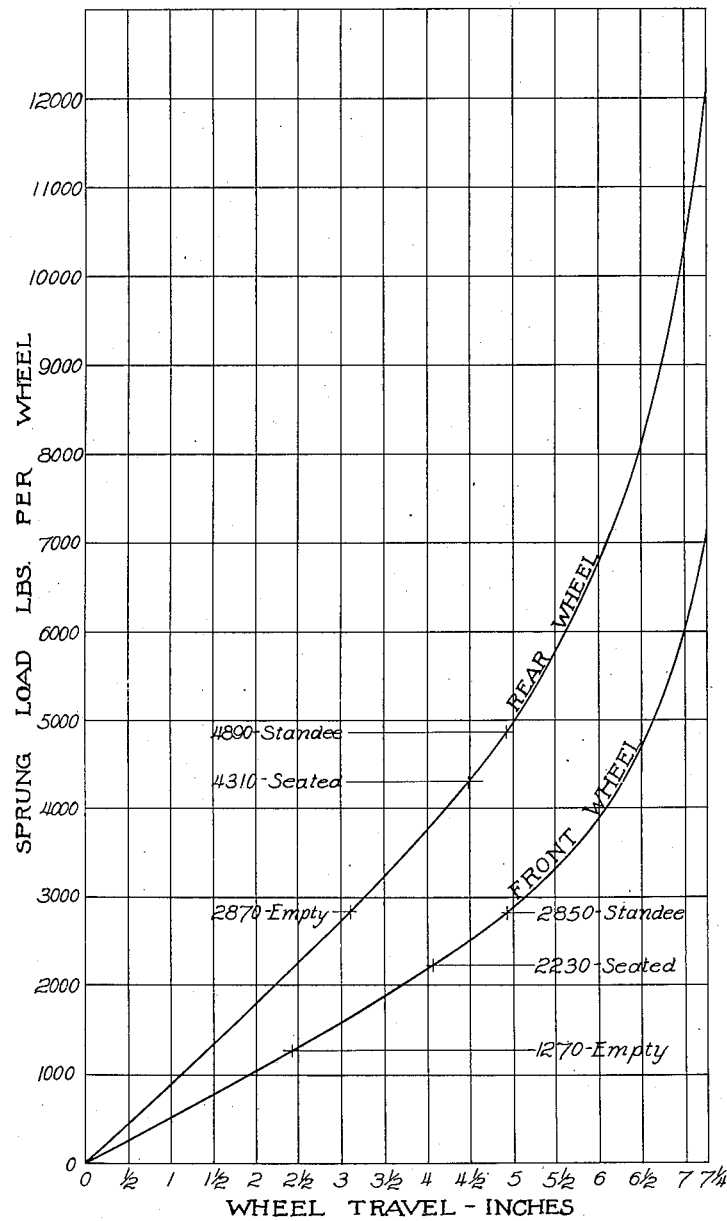
Figure 11 is a graph illustrating the effect of changing load upon the relative movement of wheels and body in a vehicle equipped with the torsion spring suspension of the invention.

In Figure 1, the invention is illustrated in a preferred embodiment as applied to a two axle vehicle having a body supporting frame generally designated at 11, and front and rear axles 12 and 13, respectively. Front axle 12 is supported by ground engaging dirigible wheels 14 while rear drive axle 13 is supported at opposite ends by dual wheels 15.

Body supporting frame 11 comprises an integral skeleton structure which is of such width as to extend laterally beyond the wheels and preferably supports a box-like body of the usual type commonly employed for passenger coaches and like vehicles. The invention is not restricted to a vehicle employing this type of body frame, as the suspension can very well be applied to any standard or other chassis suitably equipped with lateral outward extensions to which the suspension may be attached as will presently appear.

It is therefore to be understood that the term body carrying frame employed in this application is intended to refer not only to the illustrated type of vehicle where the bottom of the body comprises a heavy base frame integral with the remainder of the body skeleton frame and performing the functions of the usual chassis, but also to vehicles where the chassis is of standard or conventional type having two heavy main longitudinal frame rails to which the body is bolted or riveted.

According to the illustrated invention, each end of each axle is connected to the body frame by torsion spring suspensions designated at 16 and 17 for the front axle and 18 and 19 for the rear axle. These suspensions are mainly supported on the axles and are substantially identical in structure and operation; the suspensions at opposite sides of the vehicle on the same axle being simply reversed to suit the location.

Near the left end of axle 12, frame 11 is provided with a pair of identical longitudinally aligned tubular frame elements 21 and 22 which are disposed forwardly and rearwardly of adjacent wheel 14 closely adjacent the outer side edge of frame 11. Each of elements 21 and 22 is a relatively short cylindrical tube having its opposite ends welded or similarly secured to the outer ends of suitably located transverse frame members 23, 24 and 25, 26 respectively. The tubular form of frame elements 21 and 22 enables them to withstand more readily the large torsional stresses to which they are subjected during operation of the vehicle.

At the other end of axle 12, a pair of longitudinally axially aligned tubular frame elements 27 and 28, identical with elements 21 and 22, are rigid with frame 11. Frame elements 27 and 28 are spaced apart the same distance as elements 21 and 22 and transversely aligned therewith, and are located closely adjacent the outer side edge of frame 11, so that they are arranged in the same symmetrical relation as frame elements 21 and 22 with respect to the corresponding adjacent wheels or axle ends.

Similarly, pairs of equally spaced tubular frame elements 29, 31 and 32, 33, identical with elements 21 and 22, are rigid with frame 11 at opposite ends of drive axle 13 adjacent the outer side edges of the frame. Frame elements 29 and 31 are longitudinally aligned with each other and elements 21 and 22. Frame elements 32 and 33 are longitudinally aligned with each other and elements 27 and 28.

Tubular frame elements 21, 22, 27—29 and 31—33 are all substantially equally spaced from the side edges of frame 11 and are located as close to the frame side edges as practically possible. These tubular frame elements provide points of attachment for the spring suspensions, each associated pair of frame elements being connected to one end of the corresponding suspension as illustrated in Figure 1.

Each of suspensions 16—19 comprises a tubular torsion spring assembly 34 which is rigidly mounted on its associated axle and is preferably of the same size in all the suspensions. Front axle 12, which is of a conventional type formed with usual leaf spring seats 35, is provided with special brackets 36 for seating suspensions 16 and 17. Brackets 36 are rigidly secured to the spring seats, as by bolts 37; and at their upper ends the brackets are formed with open sockets 38 in which spring assemblies 34 are cradled.

Drive axle 13 is provided adjacent opposite ends with longitudinally disposed split brackets 39. The lower half of each bracket 39 is secured as by welding to the housing of axle 13, and the two halves securely non-rotatably clamp the associated tubular spring assembly 34 between them when bolts 41 are drawn tight.

Brackets 36 and 39 are arranged to support tubular spring assemblies 34 parallel to the longitudinal centerline of the vehicle and at right angles to the supporting axles. The tubular spring assemblies 34 at opposite sides of the same axle are located equidistantly from the adjacent wheels and are symmetrical forwardly and rearwardly of the axle. The tubular spring assemblies at the same side of the vehicle have their axes longitudinally aligned.

Tubular spring assemblies 34 may be secured to the axles by any mechanical means equivalent to the brackets above described, and for purposes of the invention the suspensions may be regarded as attached to their respective axles in the same manner.

In spring suspension 16, tubular torsion spring assembly 34 comprises a relatively rigid metal tube 42 seated and permanently secured as by welding in socket 38 of bracket 36.

Tube 42 is preferably longer than the diameter of the adjacent tire, and concentric with tube 42 is a hollow metal tube or rod 43 of appreciably smaller diameter. Rod 43 extends through tube 42 and projects therefrom at both ends for a sufficient distance to lie opposite frame elements 21 and 22 so that the transverse suspension linkages to be later described will clear the adjacent wheel.

At the opposite ends of tube 42, spaced sleeves 44 and 45 of rubber or an equivalent tough, flexible and elastic material are interposed between tube 42 and rod 43 and are permanently bonded, as by vulcanization, to the rod and a metal liner 46 within tube 42.

Preferably liner 46 is composed of three sections of very thin metal tubing. Intermediate section 47 is located centrally within tube 42 and serves as a spacer for properly locating rubber sleeves 44 and 45 which are bonded to end sections 48 and 49 of the liner. The tubular liner sections 47—49 are all secured substantially integrally and permanently to tube 42 and each other by spot welding or any similar process. Rubber sleeves 44 and 45 comprise elastic torsion spring and cushion pivot members which act simultaneously in resisting relative axial rotation between rod 43 and tube 42, compensate for substantial misalignment of the linkages, cushion the road shocks between the axle and the linkages, and at the same time serve to locate the axle positively with respect to the linkages in operation of the vehicle.

As illustrated in Figure 4, the opposite ends of rod 43 are connected by parallel outwardly extending identical suspension linkages with frame support elements 21 and 22. Referring to Figure 8, which illustrates one end of the torsion spring assembly and the attached linkage in detail, rod 43 is formed with a splined end portion 51 fitting non-rotatably within a boss 52 integral with an arm 53 extending at right angles to the axis of rod 43.

Boss 52 is embraced at opposite sides by split bosses 54 and 55 integral with legs 56 and 57 of a bifurcated lever 58. A bolt 59 is employed to close and tighten boss 54 to a good frictional fit about rod 43; and a cylindrical bolt 61, cooperating as a key with a rounded groove 62 at the end of rod 43, also closes and tightens boss 55 to a good frictional fit about rod 43 so that lever 58 is rotatable on rod 43. This arrangement permits relative angular movement between rod 43 and lever 58, but prevents relative axial movement between rod 43 and either arm 53 or lever 58.

Lever 58 is formed with an integral upper web portion 63 which extends in part over arm 53 and has an internally threaded boss 64 wherein is mounted a threaded stop bolt 65. The lower end of bolt 65 contacts a suitably formed cam surface 66 on arm 53, and bolt 65 may be locked in any position of rotative adjustment in the boss, as by a suitable lock nut 67.

Rotation of bolt 65 effects and determines relative angular displacement of arm 53 and lever 58 about the axis of rod 43. Bolt 65 also provides a stop or one-way connection for insuring rotation of arm 43 and lever 58 together during clockwise movement of lever 58 in Figure 9. Lever 58 is capable of counterclockwise movement independently of any movement of arm 43 but, since the torsion spring is under load during all conditions of operation of the vehicle, it urges arm 43 to follow counterclockwise movement of lever 58. Arm 43 and lever 58 thereby comprise an adjustable compound link, the purpose and operation of which will be later given in detail.

Referring to Figure 9, the outer end of lever 58 is provided with a boss 68 carrying a suitable pivot pin assembly 69 by means of which it is pivotally connected to the upper end of a downwardly and outwardly extending link or shackle 71 comprising spaced plates 72 and 73 (Figure 5). Adjacent its lower end, shackle 71 is provided with a pivot pin assembly 74 rotatably mounted in a boss 75 on the inner end of a bracket 76 which extends outwardly therefrom to the frame support element adjacent the outer side edge of the body.

In the illustrated embodiment, bracket 76 is rigidly secured as by bolts 77 to a mated bracket 78 welded or otherwise permanently secured to tubular frame element 21. Any equivalent manner of securely anchoring bracket 76 on the frame is within the scope of the invention.

A relatively flat cam face 79 is formed on the bottom of the inner end of bracket 76 (Figure 9). This cam face is adapted to cooperate with a non-rotatable stop bar 81 rigid with shackle plates 72 and 73 and disposed below and parallel to pivot pin 74. Coaction of bar 81 and cam face 79 limits counterclockwise rotation of shackle 71, and prevents collapse of linkage in the event that the associated torsion spring shears.

Bracket 76 is provided with an inwardly projecting lip 83 which is preferably integral with boss 75. Lip 83 serves as a support for a double acting shock absorber 84, preferably of the vane type, which is secured thereupon as by bolts 85. Operating arm 86 of shock absorber 84 is pivotally connected at 87 to the lower end of a downwardly and outwardly extending link 88. The upper end of link 88 is pivotally connected to a suitable pivot pin assembly 89 supported on a rigid lip 91 outstanding from split boss 55.

Referring to Figures 4, 6 and 10, dirt guard plates 92 are provided on the frame forwardly and rearwardly of the adjacent wheels for protecting the suspensions against dirt and water thrown up by the wheels.

The above-described suspension linkage and shock absorber arrangements of Figures 8 and 9 are duplicated at the end of rod 43 opposite from that shown in Figure 8 where the suspension linkage is attached to frame element 22.

Suspension 16 thereby comprises a longitudinal tubular torsion spring assembly having its opposite ends connected by parallel transversely flexible but longitudinally inflexible suspension linkages to frame supports disposed forwardly and rearwardly of adjacent wheel 14 and as far outwardly on frame 11 as practically possible. Suspensions 17, 18 and 19 are connected between their associated axles and frame elements in exactly the same manner and symmetry as suspension 16 and it is not necessary to further describe each such suspension in detail.

The suspension linkages between each end of each rod 43 and the frame are inflexible longitudinally of the vehicle. Hence, suspensions 16—19 prevent relative movement between the axles and the frame longitudinally of the vehicle and thereby perform the functions of radius rods. Each suspension 16—19 is therefore a combined spring suspension and radius rod assembly.

Each of suspensions 16—19 is a balanced unit acting to cushion road shocks at its associated axle end. With reference to Figures 2, 3 and 9, it is apparent that the entire weight of the frame and body acting downwardly at brackets 76 is supported by suspensions 16—19. This weight is a force which acts through shackles 71, levers 58, arms 53 and rods 43 to urge clockwise rotation (Figure 9) of rods 43, but this force is resiliently resisted by sleeves 44 and 45 of the torsion spring assemblies.

When the vehicle is standing on a level roadway the parts are in the approximate position shown in Figures 2 and 3 and in full lines in Figure 9 for all load conditions. Under these conditions the body weight is sufficient to maintain the torsion springs under predetermined torsion, and the degree of this initial torsion can be independently regulated at each axle end by adjustment of bolts 65 to change the angularity between each arm 53 and lever 58.

With the vehicle in operation, assume that one of the wheels strikes a bump on the roadway. This causes an immediate vertical rise of the associated axle end and the torsion spring assembly carried thereby toward the upper dotted line position of Figure 9. Since the body by its weight has considerable inertia to vertical upward movement, bracket 76 under these conditions may be regarded as substantially stationary establishing a fixed pivot at 74. Rise of the axle relative to the body thereby results in substantial straightening of the suspension linkage comprising shackle 71 and lever 58, with consequent relative clockwise rotation between lever 58 and rod 43.

Such clockwise rotation of lever 58 tends to increase the torsional force effective on the torsion spring but, as lever 58 and shackle 71 approach straight line relation, the mechanical advantage of the suspension linkage effective on the torsion spring is reduced. This results in the desirable condition wherein the suspension linkage has least mechanical advantage with respect to the torsion spring as the stresses increase and sleeves 44 and 45 approach their limit of cushioning torsional resistance.

As a practical matter, lever 58 and shackle 71 are never permitted to assume a straight line relation, and sleeves 44 and 45 are never placed under sufficient torsion to become rigid against torsional stress. As shown in Figures 2 and 3, resilient blocks 92 are provided on the bottom of the body to limit upward displacement of the axles relative to the body and to guard against injury to tube 42 on abnormal bumps.

The vertical distances between the axles and body, and therefore the height of the body above ground level, can be regulated by adjustment of levers 58. For example, referring to Figure 9, adjustment of bolt 65 to produce and permit clockwise rotation of lever 58 effects downward displacement of the body relative to the axle and ground level.

The transversely flexible suspensions of my invention also permit controlled relative lateral movement between frame 11 and axles 12 and 13, whereby the frame and axles constantly tend to center transversely with each other during operation of the vehicle due to the suspended weight of the frame and body.

Shock absorbers 84 each bridge a suspension linkage and their primary function is to prevent an excess of transverse movement between the frame and axles and to control it to prevent and dampen undesirable lateral oscillations during operation of the vehicle.

I have discovered that maximum stability during vehicle operation is obtained when the suspensions are all attached to the body frame as far outwardly as possible as above described, and similarly I am enabled to use smaller shock absorbers and obtain increased stability of operation by locating the shock absorbers similarly as far outwardly of the frame as possible as likewise above described.

While my invention is of sufficient scope to include the use of any suitable torsion springs at 34, the illustrated and above described rubber and metal tubular torsion spring units have proved especially satisfactory and immensely preferable for purposes of the invention. The rubber sleeves 44 and 45 not only serve as resilient torsion spring elements, but they serve as yielding bearings for the suspension.

As bearings, the rubber sleeves automatically eliminate the problem of end play present in usual mechanical bearing constructions, and enable the rods and linkages to perform the functions of radius rods in locating the axles. They are also sufficiently deformable to prevent binding due to possible misalignment of the suspension linkage. These rubber bearings do not require lubrication. In usual mechanical bearing constructions, careful lubrication is essential since faulty or neglected lubrication results in interference with free movement of the suspension linkage and alters the springing characteristics. The resilient resistance characteristics of my lubrication-free rubber bearings remain unchanged thereby providing reliable consistent springing in the suspension without expensive maintenance. This reduces maintenance costs and eliminates troubles which might arise from faulty or neglected lubrication. This eliminates the need for accurate and comparatively expensive fitting of parts required for torsion spring assemblies now employed in highway vehicles. Moreover the resilient nature of the suspension bearing permits limited deformation thereof in yielding response to abnormally strong transverse forces or blows such as sustained in an accident, so that the suspension of the invention is enabled to stand up under conditions which would rupture the usual mechanical bearing supports employed for torsion spring assemblies.

Since the rubber sleeves insulate the body from the suspension linkage, they reduce transmission of heat and sound to the body, and serve to additionally resiliently cushion and shock insulate the body from the axles. This contributes to improved riding qualities and longer vehicle life, and reduces maintenance costs.

Should the wheel encounter a depression in the roadway, the axle and spring assembly drop, approaching the lower dotted line position of Figure 9. This effects relative counterclockwise rotation of rod 43 and lever 58, thereby tending to relieve the torsional stress effective on the spring, but the mechanical advantage of the suspension linkage is increased because the vehicle weight acting through shackle 71 is effective more nearly at right angles to lever 58.

The mechanical advantage of the suspension linkage during operating conditions therefore changes inversely with the spring torsion so that the range of torsional stresses effective on the spring is relatively small. This arrangement provides substantially uniform springing under all road conditions, and contributes to riding stability. Also, as the load carried by the vehicle increases, bracket 76 and pivot point 74 become lowered relative to the axis of the associated torsion spring assembly 34. This produces corresponding clockwise rotation of lever 58 (Figure 9) and accompanying counterclockwise rotation of shackle 71 tending to straighten the linkage. Thus, as when the wheel passes over a bump as above described, the effective leverage of each suspension linkage on its torsion spring assembly fore-shortens or compensatively decreases as the vehicle load increases.

Figure 11 is a graph illustrating the limits of wheel travel (the distance between the dotted line positions of the spring assembly in Figure 9) under different load conditions. These curves prepared from actual measurements on a vehicle equipped with the suspensions of the invention show that the permissible wheel travel increases with the sprung load as would be expected. The curves show also that the permissible wheel travels are almost the same in the respective axles at any condition of loading but that as the vehicle load increases the permissible wheel travels at each axle approach each other until they are the same for a fully loaded vehicle (seats occupied and full standee load). This desirable condition results in substantially uniform riding conditions at all loads and even further improved riding qualities at heavier loads, and contributes to safety of operation of the vehicle.

*Double arm suspension*

Figures 12 and 13 illustrate a further embodiment of the invention wherein each suspension is connected to the body frame by a second torsion spring assembly similar to that carried by the axle. Torsion tube 34 is the same as illustrated in Figure 8 and is mounted on axle bracket 36.

This arrangement is useful where it is desired to reduce the wind-up and torsional movement of rubber in the suspension bearings and avoid stressing the bearings beyond the elastic limit. Where relative rotation between the lever (such as lever 58 in Figure 9) and associated torsion spring assembly is large, the torsional stresses and movement in the rubber are high. In most cases, however, I have been able to compensate and maintain the torsional stresses in the bearings within safe limits by the employment of a single relatively long lever arm 58 which functions in the suspension of Figure 9 as above described.

In the double arm embodiment shown in Figures 12 and 13, I employ two torsion spring assemblies, provided with relatively short levers otherwise similar to lever 58. Each combined lever and torsion spring assembly permits a certain vertical wheel travel, and the sum of these travels is the travel permitted by the suspension. But in each torsion spring assembly the stresses in the rubber are low because of the relatively small movement of the levers. This arrangement permits high vertical wheel travel, but the torsional stresses are divided between the two torsion spring assemblies and are much lower than where only one lever and spring are used. Where the two levers are equal in length, the stresses are evenly divided.

Referring to Figure 12, an arm 93 is non-rotatably mounted on rod 43 similarly to arm 53 in Figure 8, and a lever 94 is rotatably mounted on rod 43 similarly to lever 58 in Figure 8. A stop bolt 95, similar to bolt 65 in Figure 8, establishes a one-way connection between arm 93 and lever 94.

Lever 94 is formed at its outer end with a boss 96 which carries a suitable pivot pin assembly 97. A shackle 98 is pivotally mounted at its upper end on pin 97, and extends downwardly and laterally outwardly to be pivotally connected at its lower end to a suitable pivot pin assembly 99 carried by a boss 101 integral with the inner end of an outwardly extending lever 102.

Lever 102 is rotatably mounted on the inner end of a rod 103 projecting from a tubular torsion spring assembly 104. An arm 105 is non-rotatably connected to rod 103, and a bolt 106 similar to bolt 95 establishes a one-way connection between lever 102 and arm 105.

Levers 94 and 102 and arms 93 and 105 are preferably connected to rods 43 and 103 in exactly the same manner that lever 58 and arm 53 are connected to rod 43 in Figure 8, and further detailed description of this structure is unnecessary. Bolt 95 is adjustable to control the relative angularity of lever 94 and arm 93 and the initial torsion of torsion tube 34 in this embodiment, while bolt 106 is adjustable to control the relative angularity of lever 102 and arm 105 and the initial torsion of assembly 104.

Tubular torsion assembly 104 comprises an outer relatively rigid metal tube 107 housing spaced sleeves 108 and 109 of rubber or like elastic material vulcanized about rod 103 and to the interior of tube 107. Tube 107 is rigidly mounted in a bracket 111 bolted or welded to a frame element adjacent the outer side edge of the body frame such as frame element 21 in Figure 1.

The double arm suspension arrangements of Figures 12 and 13 may be employed with any of suspensioins 16—19 above described in place of the single arm suspension arrangements of Figures 8 and 9. Each double arm suspension linkage is also preferably bridged by a shock absorber unit connected between lever 94 and a stationary point on the body frame adjacent the outer side edge of the frame as in the previous embodiment.

Either of the above-described suspensions may be employed between the body sections and the axles in the vehicle described and claimed in my co-pending application Serial No. 210,030, filed May 25, 1938, now Patent No. 2,251,584, dated August 5, 1941.

The invention is not limited, however, to interconnecting body frames with axles which extend all the way across the body as shown in the illustrated embodiments. The invention may be applied to vehicles employing swinging half axles or independent wheel suspensions or having equivalent wheel supported structure for carrying torsion tube 34.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle having longitudinally spaced transverse axles supported at opposite ends by ground engaging wheels and a body carrying frame of such width as to extend laterally beyond said wheels, spring suspensions between the body carrying frame and each end of each axle comprising spring assemblies secured directly to the axles inwardly of the adjacent wheels and outwardly extending transverse suspension linkages connected between said spring assemblies and said body carrying frame adjacent the outer side edges of said body carrying frame.

2. In a vehicle having longitudinally spaced transverse axles supported at opposite ends by ground engaging wheels and a body of such width as to extend laterally over the wheels, separate spring suspensions between the body and each end of each axle, each of said suspensions comprising a spring assembly secured to the axle inwardly of the adjacent wheel and outwardly extending transverse suspension linkages connected between said spring assembly and the bottom of said body at points longitudinally spaced forwardly and rearwardly of said adjacent wheel and adjacent the outer side edge of said body.

3. In a vehicle having longitudinally spaced transverse axles supported at opposite ends by ground engaging wheels and a body of such width as to extend laterally over the wheels, spring suspensions between each end of each axle and the body, each of said suspensions comprising a longitudinally disposed torsion spring assembly secured to the axle inwardly of the adjacent wheel and outwardly extending suspension linkages connected between opposite ends of said spring and the bottom of said body at points longitudinally spaced forwardly and rearwardly of said adjacent wheel and adjacent the outer side edge of said body.

4. In the vehicle defined in claim 3, the torsion spring assemblies at the same side of the body being longitudinally aligned, and the points of connection of said levers with said body being all substantially equidistant from the outer side edges of the body.

5. In the vehicle defined in claim 3, each of said torsion spring assemblies comprising a tubular torsion spring arranged with its axis substantially parallel to the longitudinal centerline of the vehicle.

6. In a vehicle equipped with wheel supported structures provided with ground engaging wheels and having a body supporting frame extending laterally outwardly of said wheels, a plurality of torsion spring assemblies mounted on said wheel supported structures, and a plurality of transverse suspension linkages connecting said spring assemblies with said frame adjacent the outer side edges of said frame.

7. In the vehicle defined in claim 6, said suspension linkages permitting relative lateral movement between the frame and the wheel supported structures, and individual shock absorbers for each linkage disposed adjacent the outer side edges of said frame and adapted to control said movement.

8. In a vehicle, a body supporting frame having ground engaging wheels and wheel supported structure beneath opposite sides, said frame being of such width as to extend laterally beyond said wheels, and a separate spring suspension between each wheel supported structure and the frame comprising a longitudinally disposed torsion spring assembly secured to said structure and a pair of outwardly extending generally parallel transverse suspension linkages connecting said spring assembly to said frame at points spaced forwardly and rearwardly of said wheel and adjacent the outer side edge of said frame.

9. A vehicle spring suspension for connecting a ground engaging wheel and associated wheel supported structure to a body carrying frame which extends laterally outwardly of said wheel, comprising a torsion spring assembly and a system of laterally extending force transmitting links, said suspension being connected to the frame closely adjacent the outer side edge of the latter and to said wheel supported structure inwardly of the wheel.

10. In the vehicle spring suspension defined in claim 9, the mechanical advantage of said system effective upon said spring automatically varying in inverse relation to the torsional stress to which said spring is subjected.

11. In a vehicle equipped with a transverse axle having ground engaging wheels at opposite ends and a body carrying frame of such width as to extend laterally outwardly of said wheels, a spring suspension between each end of the axle and said frame comprising a torsion spring secured to the axle inwardly of the adjacent wheel and a system of laterally outwardly extending force transmitting links connecting the spring to the outer side edges of the frame, said system being substantially inflexible longitudinally of the vehicle.

12. In a vehicle, wheel supported structure, a longitudinally disposed torsion spring assembly carried by said structure, a body supporting frame, a suspension linkage interconnecting said spring assembly and said frame comprising a transverse lever on said spring assembly and a downwardly and outwardly extending link pivotally connected at its upper end to said lever and at its lower end to a member on said frame.

13. In the vehicle defined in claim 12, said member comprising a bracket rigid with said frame and attached to said frame adjacent the outer side edge of the latter.

14. In the vehicle defined in claim 12, said member comprising a torsion spring assembly supported on the frame adjacent the outer side edge of the latter.

15. In a vehicle defined in claim 12, cooperating means on said link and frame for limiting pivotal movement of said link.

16. In a vehicle having a frame and spaced transverse axles supported at opposite ends by ground engaging wheels, individual torsion spring suspensions between each end of each axle and said body, each of said suspensions including a torsion spring assembly comprising longitudinally disposed concentric members interconnected by a body of rubber or like elastic material adapted to resist relative rotation of said members, means for supporting each of said suspensions on its associated axle, and means connecting each of said spring assemblies to the frame, said bodies of elastic material providing yieldable pivot bearings for said suspensions.

17. In a vehicle, a body supporting frame, a transverse axle beneath said frame having ground engaging wheels on opposite ends, and resilient suspensions between each end of said axle and said frame; each of said suspensions comprising a longitudinal tube rigid with said axle inwardly of the adjacent wheel, a sleeve of resilient material within said tube, a rod concentric with said tube extending through said sleeve and projecting beyond both ends of said tube, said sleeve being permanently bonded to said tube and rod so as to resist relative rotation between said tube and rod, and substantially parallel transverse linkages pivotally connecting the opposite ends of said rod with said frame.

18. In a vehicle, a body supporting frame, a transverse axle having ground engaging wheels at opposite ends, and resilient suspensions interconnecting said frame and the opposite ends of said axle; each of said suspensions comprising a hollow tube rigid with said axle inwardly of the adjacent wheel and extending longitudinally of said vehicle, a rod concentric with said tube and projecting therefrom at opposite ends, resilient means comprising a rubber or like sleeve between said tube and rod, said sleeve being permanently bonded to both tube and rod, parallel levers on opposite ends of said tube and extending outwardly toward the vehicle side, parallel depending links pivotally connected to said arms and means pivotally connected to said links attaching said suspension to the frame at points spaced forwardly and rearwardly of said adjacent wheel and adjacent the outer side edges of said body.

19. In a vehicle, a body carrying frame and a transverse axle therebeneath, a torsion spring suspension comprising a member mounted on said axle, a second member connected by transverse linkage to said frame, and a body of resilient material bonded between said members for resisting relative rotation of said members, said body serving as a cushioning and insulating bearing and said suspension being sufficiently rigid and inflexible longitudinally of the vehicle so that it functions as a radius rod for said axle as well as a spring.

20. In a vehicle suspension interconnecting wheel supported structure and a body carrying frame, a torsion spring mounted on said structure and comprising a pair of relatively rotatable resiliently interconnected members, a compound lever extending outwardly from one of said spring members comprising a first section rotatable on said one member and a second section rigid with said one member, means adapting said lever sections to move together as a unit as the spring is loaded in one direction and permitting said lever sections to move independently of each other as the spring is loaded in the opposite direction, and a link pivotally connecting said first lever section to a point on the frame.

21. In the vehicle suspension defined in claim 20, said means comprising an adjustable connection between said lever sections.

22. In a vehicle spring suspension interconnecting wheel supported structure and a body carrying frame, a torsion spring mounted on said structure comprising a longitudinally extending hollow tube rigid with said structure, a rod extending through said tube and having its opposite ends projecting therefrom, spaced sleeves of rubber or like resilient material bonded between said tube and rod for resisting relative rotation thereof, and laterally outwardly extending transverse linkages flexibly connecting opposite ends of said rod to spaced points on the frame.

23. In a vehicle, a body carrying frame and a transverse axle therebeneath, a torsion spring mounted on said axle and comprising a pair of resiliently coupled members, a transverse lever secured to one of said members and extending laterally outwardly therefrom, a bracket rigid with said frame, and a shackle pivoted to the outer end of said lever and extending downwardly and outwardly into pivotal connection with said bracket.

24. In a vehicle suspension interconnecting wheel supported structure and a body carrying frame, a pair of longitudinally disposed torsion springs, one mounted on said structure and the other mounted on the frame laterally outwardly of said one spring, transverse levers on said springs extending toward each other, and a link pivotally interconnecting said levers.

25. In a vehicle suspension interconnecting wheel supported structure and a body carrying frame, a longitudinally disposed torsion spring mounted on said structure, and a pair of torsion springs connecting opposite ends of said first-mentioned torsion spring to spaced portions of said frame.

26. In a vehicle having longitudinally spaced transverse axles supported at opposite ends by ground engaging wheels and a body of such width as to extend laterally outwardly over the wheels, longitudinally disposed torsion spring assemblies interconnecting each end of each axle with the bottom of the body at widely spaced points located adjacent the outer side edges of the body, each of said spring assemblies comprising a rubber or like resilient body adapted to yieldably resist torsional forces incident on the spring assembly and functioning as a yieldable shock and sound proof bearing for said spring assembly, and all providing a highly stable, quietly operating vehicle.

WILLIAM B. FAGEOL.